United States Patent
Atluri et al.

(10) Patent No.: US 8,527,470 B2
(45) Date of Patent: *Sep. 3, 2013

(54) RECOVERY POINT DATA VIEW FORMATION WITH GENERATION OF A RECOVERY VIEW AND A COALESCE POLICY

(76) Inventors: Rajeev Atluri, Corona, CA (US); Sudhakar Pannerselvam, Hyderabad (IN); Jayesh Shah, Hyderabad (IN); Satish Kumar, Andhra Pradesh (IN); Srin Kumar, Sunnyvale, CA (US)

(*) Notice: Subject to any disclaimer, the term of this patent is extended or adjusted under 35 U.S.C. 154(b) by 451 days.

This patent is subject to a terminal disclaimer.

(21) Appl. No.: 12/344,345

(22) Filed: Dec. 26, 2008

(65) Prior Publication Data

US 2010/0169283 A1    Jul. 1, 2010

Related U.S. Application Data

(62) Division of application No. 11/438,401, filed on May 22, 2006, now Pat. No. 7,676,502.

(51) Int. Cl.
*G06F 17/00* (2006.01)

(52) U.S. Cl.
USPC .......................................... 707/674; 707/640

(58) Field of Classification Search
CPC ............ G06F 11/1469; G06F 11/1471; G06F 17/30008
USPC ................................ 707/674, 999.204, 640
See application file for complete search history.

(56) References Cited

U.S. PATENT DOCUMENTS

| | | | |
|---|---|---|---|
| 5,193,162 A * | 3/1993 | Bordsen et al. | 711/152 |
| 5,193,181 A | 3/1993 | Barlow et al. | |
| 5,313,612 A | 5/1994 | Satoh et al. | |
| 5,446,871 A | 8/1995 | Sholmer et al. | |
| 5,621,882 A | 4/1997 | Kakuta | |
| 5,664,189 A * | 9/1997 | Wilcox et al. | 707/690 |
| 5,805,785 A | 9/1998 | Dias et al. | |

(Continued)

FOREIGN PATENT DOCUMENTS

WO   WO-2004021677 A1    3/2004

OTHER PUBLICATIONS

Data Protection—Perform Zero Downtime Backups [online Jan. 29, 2009]. Retrieved from the Internet URL: http://stage.hp.resource.com/sbso/bus_protect/data_protect/zero_downtime.

(Continued)

*Primary Examiner* — Phuong Thao Cao
(74) *Attorney, Agent, or Firm* — Raj Abhyaker, P.C.

(57) ABSTRACT

Methods, software suites, networks, and systems of recovery point data view formation with generation of a recovery view and a coalesce policy are disclosed. In one embodiment, a network includes a virtualization module to form a data view around a recovery point, a recovery module to generate a recovery snapshot having an ability to position forward and backward from the recovery point when a rolling algorithm is applied, and an events module to generate a coalesce policy around the recovery point to reduce a storage requirement. The network may include an export module to transfer the data view to an external processing device as a virtual volume using one or more of an iSCSI and a fiber channel transport interface. The export module may automatically communicate the data view to a backup tape to provide extended data retention using a lifecycle management policy.

20 Claims, 8 Drawing Sheets

(56) References Cited

U.S. PATENT DOCUMENTS

| | | | |
|---|---|---|---|
| 5,875,479 A | 2/1999 | Blount et al. | |
| 5,930,824 A | 7/1999 | Anglin et al. | |
| 6,061,769 A * | 5/2000 | Kapulka et al. | 711/162 |
| 6,175,932 B1 | 1/2001 | Foote et al. | |
| 6,247,141 B1 | 6/2001 | Homberg | |
| 6,269,431 B1 | 7/2001 | Dunham | |
| 6,324,654 B1 | 11/2001 | Wahl et al. | |
| 6,327,579 B1 | 12/2001 | Crawford | |
| 6,490,691 B1 | 12/2002 | Kimura et al. | |
| 6,647,399 B2 | 11/2003 | Zaremba | |
| 6,691,140 B1 | 2/2004 | Bogrett | |
| 6,714,980 B1 | 3/2004 | Markson et al. | |
| 6,732,125 B1 * | 5/2004 | Autrey et al. | 707/640 |
| 6,742,139 B1 | 5/2004 | Forsman et al. | |
| 6,833,073 B2 | 12/2004 | Agarwal | |
| 6,915,315 B2 * | 7/2005 | Autrey et al. | 1/1 |
| 6,938,134 B2 * | 8/2005 | Madany | 711/161 |
| 6,981,177 B2 | 12/2005 | Beattie | |
| 7,093,086 B1 | 8/2006 | Rietschote | |
| 7,155,586 B1 | 12/2006 | Wagner et al. | |
| 7,165,156 B1 | 1/2007 | Cameron et al. | |
| 7,206,911 B2 | 4/2007 | Wolfgang et al. | |
| 7,237,021 B2 | 6/2007 | Penney et al. | |
| 7,251,749 B1 | 7/2007 | Fong et al. | |
| 7,254,682 B1 * | 8/2007 | Arbon | 711/161 |
| 7,406,488 B2 * | 7/2008 | Stager et al. | 1/1 |
| 7,418,547 B2 * | 8/2008 | Lam | 711/113 |
| 7,426,618 B2 * | 9/2008 | Vu et al. | 711/162 |
| 7,574,622 B2 * | 8/2009 | Soran et al. | 714/6.22 |
| 7,676,502 B2 | 3/2010 | Atluri et al. | |
| 7,720,817 B2 * | 5/2010 | Stager et al. | 707/649 |
| 7,849,257 B1 * | 12/2010 | Kim | 711/112 |
| 2001/0029477 A1 * | 10/2001 | Freeman et al. | 705/36 |
| 2002/0008795 A1 | 1/2002 | Koyama et al. | |
| 2002/0087950 A1 * | 7/2002 | Brodeur et al. | 717/124 |
| 2002/0124013 A1 | 9/2002 | Loy et al. | |
| 2003/0093579 A1 | 5/2003 | Zimmer et al. | |
| 2004/0031030 A1 | 2/2004 | Kidder et al. | |
| 2004/0093474 A1 | 5/2004 | Lin et al. | |
| 2004/0107226 A1 * | 6/2004 | Autrey et al. | 707/204 |
| 2004/0199515 A1 | 10/2004 | Penney et al. | |
| 2004/0205390 A1 | 10/2004 | Kanevsky et al. | |
| 2004/0260678 A1 * | 12/2004 | Verbowski et al. | 707/3 |
| 2005/0010835 A1 | 1/2005 | Childs et al. | |
| 2005/0015416 A1 * | 1/2005 | Yamagami | 707/204 |
| 2005/0032479 A1 * | 2/2005 | Miller et al. | 455/67.11 |
| 2005/0033930 A1 | 2/2005 | Haruma et al. | |
| 2005/0044162 A1 * | 2/2005 | Liang et al. | 709/212 |
| 2005/0050386 A1 | 3/2005 | Reinhardt et al. | |
| 2005/0055603 A1 * | 3/2005 | Soran et al. | 714/7 |
| 2005/0071390 A1 * | 3/2005 | Midgley et al. | 707/204 |
| 2005/0138090 A1 | 6/2005 | Augenstein et al. | |
| 2005/0138204 A1 | 6/2005 | Iyer et al. | |
| 2005/0182953 A1 * | 8/2005 | Stager et al. | 713/189 |
| 2005/0188256 A1 * | 8/2005 | Stager et al. | 714/13 |
| 2005/0198303 A1 | 9/2005 | Knauerhase et al. | |
| 2005/0223181 A1 | 10/2005 | Jeppsen et al. | |
| 2005/0240792 A1 | 10/2005 | Sicola et al. | |
| 2005/0251540 A1 | 11/2005 | Sim-Tang | |
| 2005/0257085 A1 | 11/2005 | Haustein et al. | |
| 2005/0262097 A1 | 11/2005 | Sim-Tang et al. | |
| 2005/0262377 A1 * | 11/2005 | Sim-Tang | 714/1 |
| 2005/0267920 A1 | 12/2005 | Helliker et al. | |
| 2006/0010227 A1 * | 1/2006 | Atluri | 709/217 |
| 2006/0031468 A1 | 2/2006 | Atluri et al. | |
| 2006/0047714 A1 * | 3/2006 | Anderson et al. | 707/202 |
| 2006/0053139 A1 * | 3/2006 | Marzinski et al. | 707/101 |
| 2006/0114497 A1 | 6/2006 | Anderson et al. | |
| 2006/0149793 A1 * | 7/2006 | Kushwah et al. | 707/203 |
| 2006/0149798 A1 * | 7/2006 | Yamagami | 707/204 |
| 2006/0155912 A1 | 7/2006 | Singh et al. | |
| 2006/0218434 A1 | 9/2006 | Solhjell | |
| 2007/0033356 A1 * | 2/2007 | Erlikhman | 711/162 |
| 2007/0038998 A1 | 2/2007 | Fries | |
| 2007/0055833 A1 * | 3/2007 | Vu et al. | 711/162 |
| 2007/0168404 A1 | 7/2007 | Nakamura et al. | |
| 2007/0244938 A1 | 10/2007 | Michael et al. | |
| 2007/0271428 A1 | 11/2007 | Atluri | |
| 2009/0177718 A1 * | 7/2009 | Patterson et al. | 707/204 |
| 2009/0300412 A1 * | 12/2009 | Soran et al. | 714/6 |

OTHER PUBLICATIONS

HP Open View Storage Data Protector 5.1 Software [online] [retrieved on Jan. 29, 2009]. Retrieved from the Internet URL: http://www.hp.com/products1/storage/pdfs/media/OVDPds2.pdf.

Storagecraft Technology Corporation: Protecting Windows Servers and PCs with Fast and Reliable Online Backup and Bare Metal Recovery Solutions [online] [retrieved on Jan. 29, 2009]. Retrieved from the Internet URL: http://www.rmwtug.org/Talks/ShadowStor/ShadowProtectdsheet.pdf.

* cited by examiner

RECOVERY POINT DATA VIEW FORMATION WITH GENERATION OF A RECOVERY VIEW AND A COALESCE POLICY

CLAIM OF PRIORITY

This application is a divisional application of U.S. patent application Ser. No. 11/438,401 titled "Recovery point data view shift through a direction-agnostic roll algorithm" filed on May 22, 2006, currently issued as U.S. Pat. No. 7,676,502.

FIELD OF TECHNOLOGY

This disclosure relates generally to the technical fields of software and/or hardware technology and, in one example embodiment, to recovery point data view formation with generation of a recovery view and a coalesce policy

BACKGROUND

Data may be recovered from a recovery point, but determining what other data is stored near the recovery point may require additional accesses of the data near the recovery point. The additional accesses may require expenditure of additional processing energy, user time, and unnecessary use of physical memory. In addition, other data near the recovery point may remain unknown and may fail to be recovered.

The data recovered may include a recovery snapshot of a recovery point, but data positioned forward or backward may remain unknown. Again, additional recovery requests may be needed to acquire the data positioned forward and/or backward of the recovery point, which may consume additional resources (e.g., time, financial expense, storage space, etc.) and result in further inefficiencies.

Finally, excessive data may be stored and/or retained. Equal amounts of data, regardless of their relative importance, may be stored with the same quality of retention. Preserving more important and less important data equally without consideration of a policy for preservation of such data may result in consumption of excess resources and/or premature loss of more important data.

SUMMARY

Methods, software suites, networks, and systems of recovery point data view formation with generation of a recovery snapshot and a coalesce policy are disclosed. In one aspect, a network includes a virtualization module to form a data view around a recovery point, a recovery module to generate a recovery snapshot having an ability to position forward and backward from the recovery point when a rolling algorithm is applied, and an events module to generate a coalesce policy around the recovery point to reduce a storage requirement.

The network may include an export module to transfer the data view to an external processing device as a virtual volume using one or more of an iSCSI and a fiber channel transport interface. The export module may automatically communicate the data view to a backup tape to provide extended data retention using a lifecycle management policy. The network may include an instantiation module of the virtualization module to generate a virtual view of a data state and to communicate the virtual view to a virtual view database.

The network may include a pausing module to pause a data operation and/or a client operation. The virtual view may be specific to a volume object in a kernel that imitates another volume having an original data. The virtual view may be managed by a kernel space that processes an access request through one or more table using a meta-data created in a retention log.

A change log data may be applied when the virtual view is unfrozen after a user session reaches a level state. The coalesce policy may be used to determine a variable quantity of data to be coalesced based on an algorithm. The algorithm may be affected by space utilization and a data consistency with one or more of a data prior to a recovery point and data after the recovery point.

The network may include an age dependent data mechanism to coalesce data based on a coalescing policies database and a coalescing module. The coalesce policy may affect a number of data points retained for a selected time period. The coalesce policy may be altered by one or more of a repeated time interval, a system event, a configuration change, an access event, and an event module indication.

In another aspect, a method includes forming a data view around a recovery point, generating a recovery snapshot having an ability to position forward and backward from the recovery point when a rolling algorithm is applied and generating a coalesce policy around the recovery point to reduce a storage requirement.

The method may include transferring the data view to an external processing device as a virtual volume using one or more of an iSCSI and a fiber channel transport interface. The method may include automatically communicating the data view to a backup tape to provide extended data retention using a lifecycle management policy. The method may further include generating a virtual view of a data state and communicating the virtual view to a virtual view database.

The method may also include pausing at least one of a data operation and a client operation when a virtual view may be generated. The method may include managing a virtual view using a kernel space that processes an access request through one or more table using a meta-data created in a retention log.

In yet another aspect, a software suite includes a portion to form a data view around a recovery point using a processor and a physical memory, a portion to generate a recovery snapshot having an ability to position forward and backward from the recovery point when a rolling algorithm is applied and a portion to generate a coalesce policy around the recovery point to reduce a storage requirement.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Methods, software suites, networks, and systems of recovery point data view formation with generation of a recovery view and a coalesce policy are disclosed. In the following description, for the purposes of explanation, numerous specific details are set forth in order to provide a thorough understanding of the various embodiments. It will be evident, however to one skilled in the art that the various embodiments may be practiced without these specific details.

Figure 3:
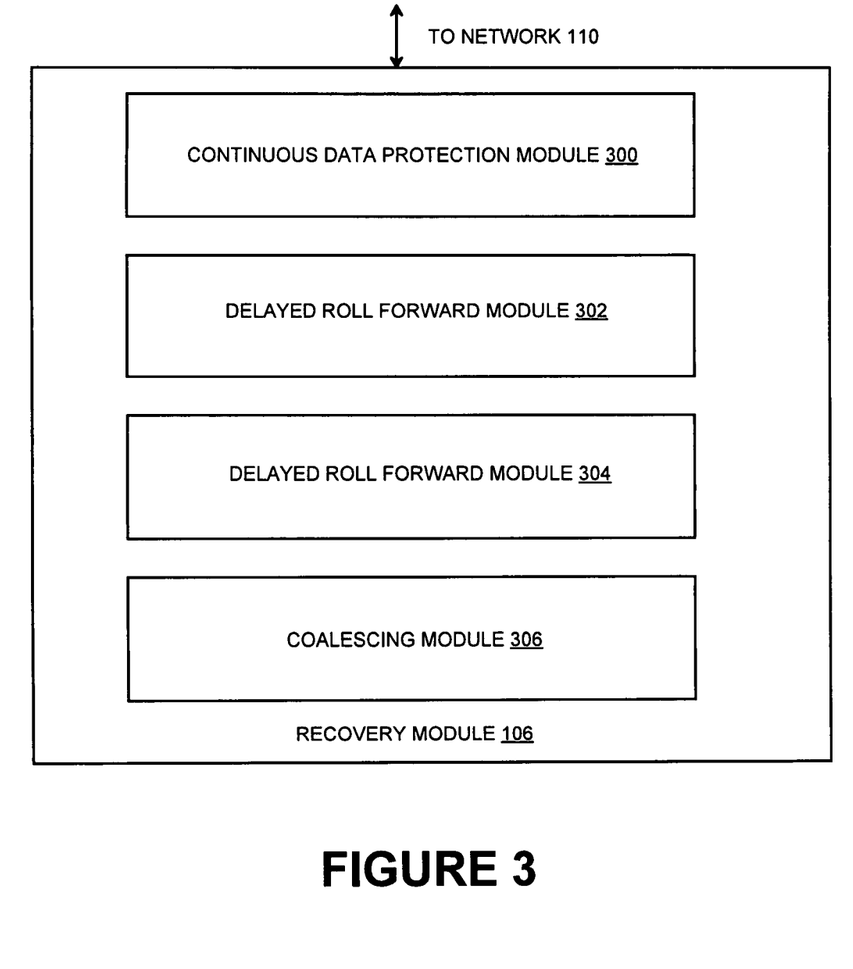
FIG. 3 is an exploded view of the recovery module of FIG. 1 having a continuous data protection module, a delayed roll forward module, a delayed roll backward module, and/or a coalescing module, according to one embodiment.

In an example embodiment, a data view is formed (e.g., formed by a virtualization module 104 of FIG. 1) around a recovery point (e.g., as specified by an events module 108 of FIG. 1), and the data view is shifted (e.g., shifted by a recovery module 106 of FIG. 1) around the recovery point through a direction-agnostic roll algorithm that uses at least one of a roll-forward algorithm (e.g., a roll-forward algorithm of a delayed roll forward module 302 of FIG. 3) to shift the data view to a time after the recovery and a roll-backward algorithm (e.g., a roll backward algorithm of a delayed roll backward module 304 of FIG. 3) to shift the data view to a time before the recovery point.

Figure 4:
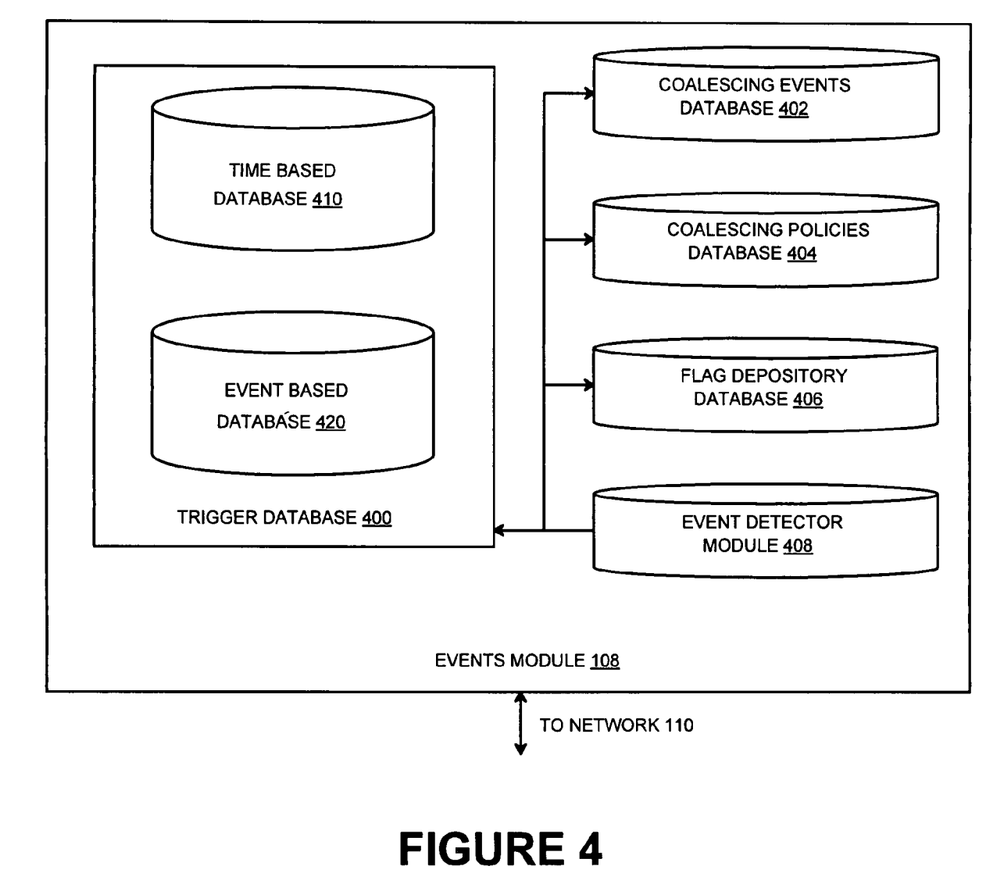
FIG. 4 is an exploded view of the events module of FIG. 1 having a trigger database having a time based database and/or a event based database, a coalescing events database, a coalescing policies database, a flag depository database, and/or an event detector module, according to one embodiment.

In an additional example embodiment, a recovery snapshot is generated (e.g., generated by a virtualization module 104 of FIG. 1) at a predetermined interval (e.g., as specified by an events module 108 of FIG. 4) to retain an ability to position forward and backward when a delayed roll back algorithm (e.g., a delayed roll back algorithm of a delayed roll backward module 304 of FIG. 3) is applied, and a virtual view may be created (e.g., created by the virtualization module 104 of FIG. 2) using an algorithm (e.g., a continuous disaster recovery algorithm of a continuous data protection module 300 of FIG. 3) tied to an original data, a change log data, and a consistency data related to an event (e.g., as specified by the events module 108 of FIG. 4).

In a further example embodiment, a network having a virtualization module (e.g., a virtualization module 104 of FIG. 2) forms a data view around a recovery point (e.g., as specified by an events module 108 of FIG. 4), a recovery module (e.g., a recovery module 106 of FIG. 3) generates a recovery snapshot having an ability to position forward and/or backward from the recovery point when a rolling algorithm (e.g., a rolling algorithm of a delayed roll forward module 302 and/or a delayed roll backward module 304 of FIG. 3) is applied, and an events module (e.g., the events module 108 of FIG. 4) to generate a coalesce policy (e.g., a coalesce policy in a coalescing policies database 404 of FIG. 4) around the recovery point (e.g., as specified by the events module 108 of FIG. 4) to reduce a storage requirement.

Figure 8:
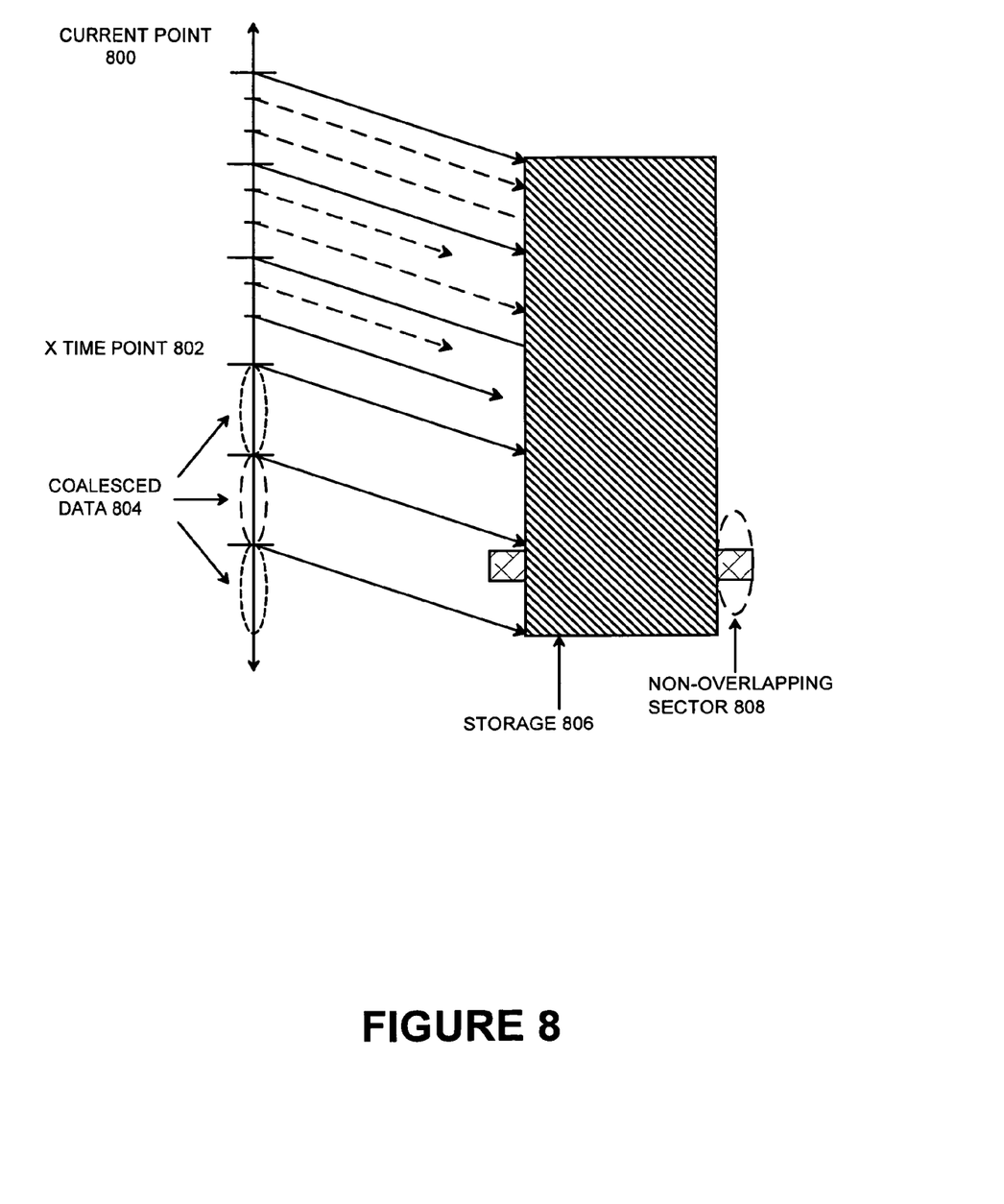
FIG. 8 is a graphical view of a coalesce process, according to one embodiment.

In a further embodiment, a method includes determining a temporal window based on at least one of a user data and an automatically generated data, coalescing data between events prior to the temporal window, and capturing data between events after the temporal window (e.g., as illustrated in FIG. 8). The coalescing data between events prior to the temporal window may be determined by a set of overlapping operations to a data set, wherein certain operations have non-overlapping sectors which are not coalesced.

Figure 1:
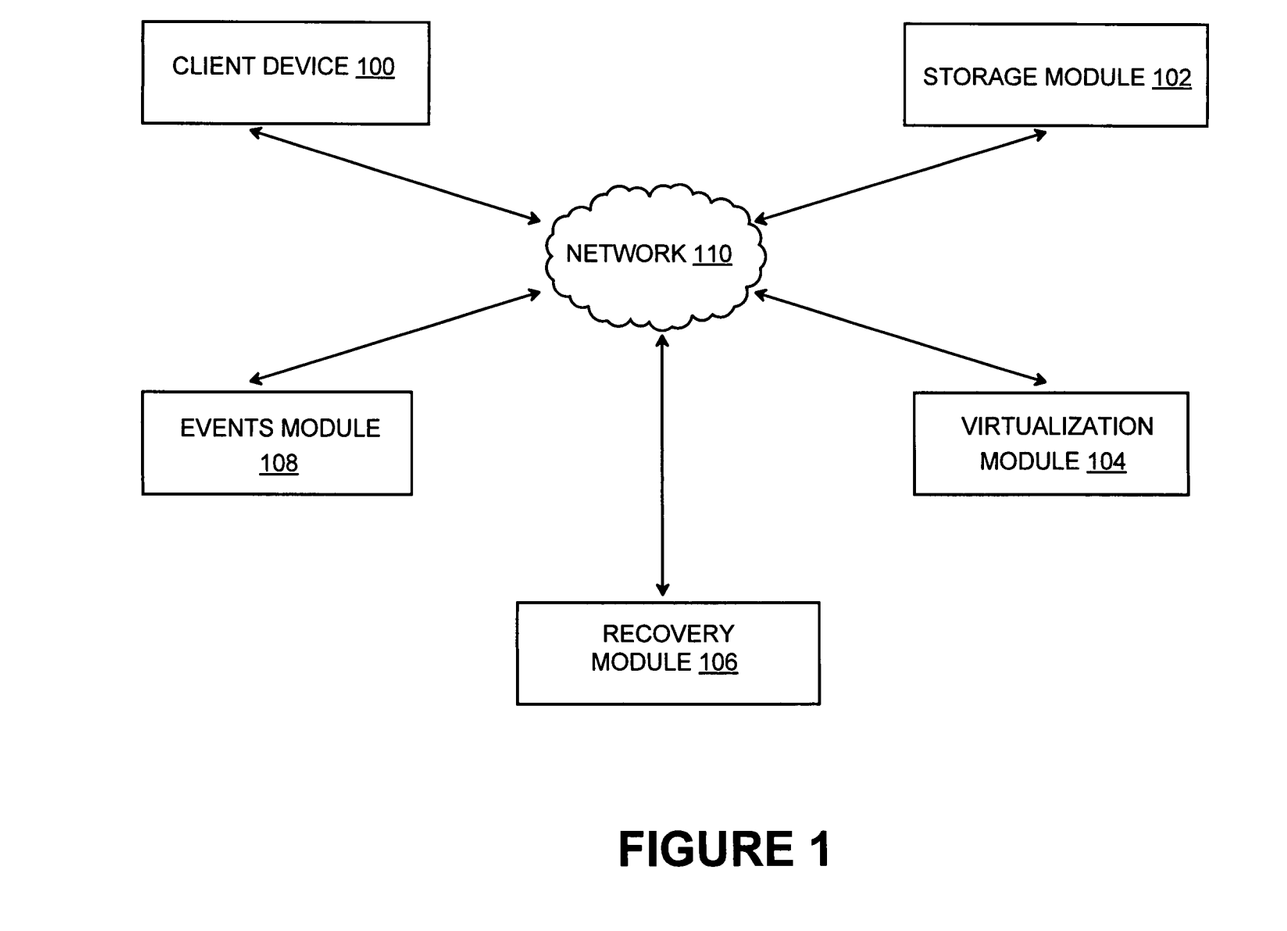
FIG. 1 is a system view of a virtualization module, a recovery module, that communicates with a client device, an events module, and/or a storage module through a network, according to one embodiment.

FIG. 1 is a system view of a virtualization module 104, a recovery module 106, that communicates with a client device 100, an events module 108, and/or a storage module 102 through a network 110, according to one embodiment.

A client device (e.g., the client device 100) may be an end user device (e.g., a customer interface, a system administrator control device, and/or a technical support device, etc.). A storage module (e.g., the storage module 102) may be a volatile storage (e.g., DRAM, RDRAM, and/or SRAM, etc.) and/or a non-volatile storage (e.g., hard disk drive, RAID array, SCSI drive, SATA drive, magnetic tape, CD, and/or DVD, etc.). A network (e.g., the network 110) may be a LAN, WAN, and/or an Internet. A virtualization module (e.g., the virtualization module 104) is best understood with reference to FIG. 2, as will later be described. The recovery module 106 may also be best understood with reference to FIG. 3, and the events module 108 may best be understood with reference to FIG. 4.

In another embodiment, the client device 100 may generate a data operation (e.g., a data storage, a data backup, a data retrieval, a data modification, a data transfer, etc.) request through the network 110 (e.g., LAN, WAN, and/or Internet, etc.). For example, the client device 100 may define an event (e.g., midnight, every 5 minutes, system crash, configuration change, failed log-in, and/or as indicated by the events module 108 of FIG. 1, etc.) through communicating with the events module 108. The client device 100 may also generate a request for backup via communication with the recovery module 106. A data backed up by the recovery module 106 may be stored in the storage module 102.

The recovery module 106 may also provide a mechanism to continuously backup data as well as a means to access data points relative to a reference data point.

The reference data point may be associated with an event (e.g., midnight, every 5 minutes, system crash, configuration change, failed log-in, and/or as indicated by the events module 108 of FIG. 1, etc.) stored in the events module 108. Before a data point associated with the event (e.g., midnight, every 5 minutes, system crash, configuration change, failed log-in, and/or as indicated by the events module 108 of FIG. 1, etc.) is accessed, the virtualization module 104 may generate a data view (e.g., a virtual view) such that the original data may not need to be modified.

An example embodiment provides methods and systems to form (e.g., formed by the virtualization module 106) a data view (e.g., a virtual view, an original view, etc.) around a recovery point (e.g., midnight, every 5 minutes, system crash, configuration change, failed log-in, and/or as specified in the events module 108 etc.) and shift the data view (e.g., a virtual view, an actual view, etc.) around the recovery point through a direction-agnostic roll algorithm that uses a roll-forward algorithm (e.g., to roll to a data state that occurred later in time than the reference data, etc.) to shift the data view (e.g., a virtual view, an actual view, etc.) to a time after the recovery point (e.g., midnight, every 5 minutes, system crash, configuration change, failed log-in, and/or as specified in the events module 108 etc.) and/or a roll-backward algorithm (e.g., to roll to the data state that occurred earlier in time than the reference data, etc.) to shift the data view (e.g., a virtual view, an original view, etc.) to a time before the recover point (e.g., midnight, every 5 minutes, system crash, configuration change, failed log-in, and/or as specified in the events module 108 etc.).

Another example embodiment provides methods and systems to generate a recovery snapshot (e.g., to generate a virtual snapshot with the virtualization module 104, etc.) at a predetermined interval (e.g., midnight, every 5 minutes, system crash, configuration change, failed log-in, and/or as indicated by the events module 108 of FIG. 1, etc.) to retain an ability to position forward (e.g., to roll to a data state that occurred later in time than the reference data, etc.) and/or backward (e.g., to roll to the data state that occurred earlier in time than the reference data, etc.) when a delayed roll back algorithm is applied, and create a virtual view (e.g., create a virtual view using the virtualization module 104, etc.) of the recovery snapshot using an algorithm (e.g., a continuous recovery algorithm of the recovery module 106) tied to an original data, a change log data, and a consistency data related to an event (e.g., midnight, every 5 minutes, system crash, configuration change, failed log-in, and/or as indicated by the events module 108 of FIG. 1, etc.).

A further example embodiment includes a virtualization module 104 to form a data view (e.g., a virtual view, an actual view, etc.) around a recovery point (e.g., midnight, every 5 minutes, system crash, configuration change, failed log-in, and/or as specified in the events module 108, etc.), and/or an events module 108 to generate a coalesce policy (e.g., to retain data every 5 minutes for data that is older than 10 years, to retain data every 2 minutes for data that is less than 10 years old, etc.) around the recovery point (e.g., midnight, every 5 minutes, system crash, configuration change, failed log-in, and/or as specified in the events module 108, etc.) to reduce a storage requirement (e.g., to decrease a storage capacity requirement of the storage module 102). The generated coalesce policy may be used (e.g., used by the recovery module 106) to coalesce (e.g., combine, compile, etc.) backed up data to optimize storage requirements.

Figure 2:
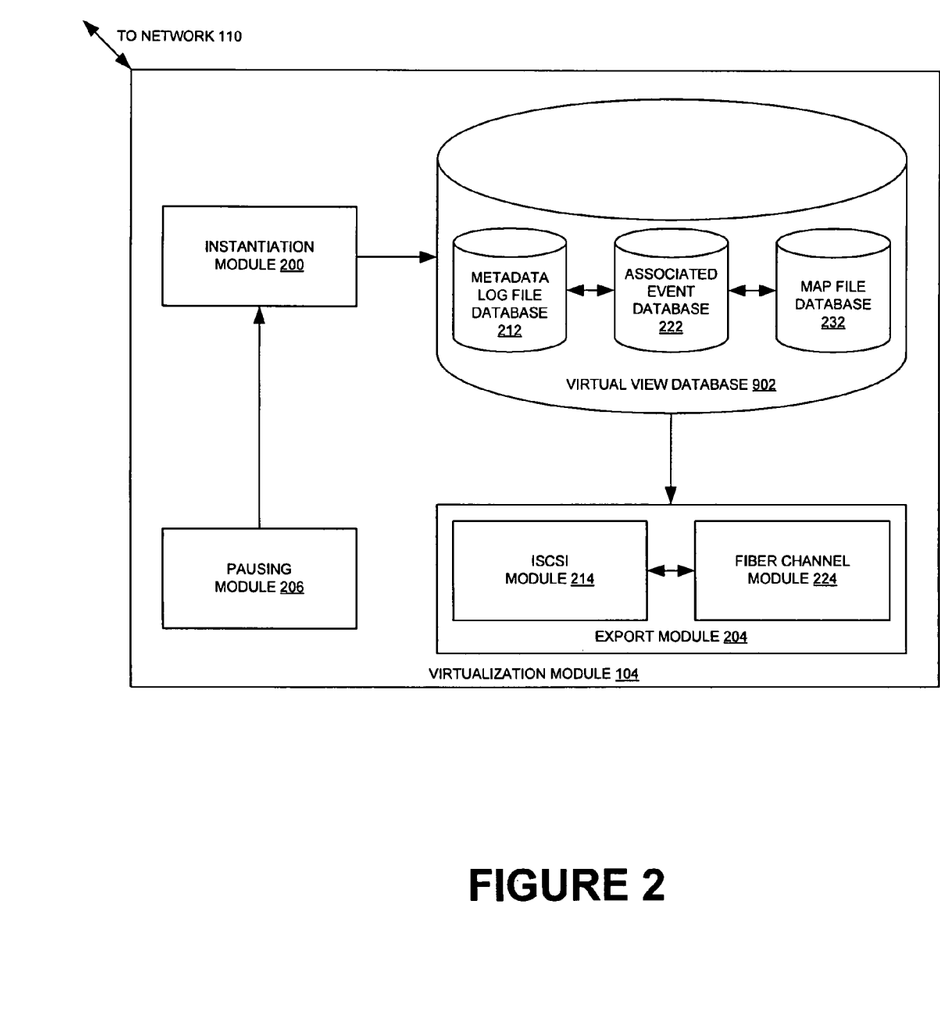
FIG. 2 is an exploded view of the virtualization view module of FIG. 1 having an instantiation module, a pausing module, a virtual view database having a metadata log file database, an associated event database, and/or a map file database, and/or an export module having an iSCSI module, and/or a fiber channel module, according to one embodiment.

FIG. 2 is an exploded view of the virtualization module 104 of FIG. 1 having an instantiation module 200, a pausing module 206, a virtual view database 202 that may include a metadata log file database 212, an associated event database 222, and/or a map file database 232, and/or an export module 204 having an ISCSI module 214, and/or a fiber channel module 224, according to one embodiment.

The instantiation module 200 may be a circuit and/or a piece of software code that generates a virtual view of a data state. The instantiation module 200 may communicate with the pausing module 206 to determine when the virtual view should be generated to ensure validity and/or accuracy. The instantiation module 200 may also communicate the generated virtual view to the virtual view database 202 to be stored.

According to one embodiment, the virtual view may be instantiated by an instantiation module (e.g., the instantiation module 200) of the virtual view module 104. The virtual view may be generated after a data operation and/or a client operation (e.g., a client operation of the client device 100 of FIG. 1) has been suspended and/or paused (e.g., paused by the pausing module 206) to ensure a validity and/or accuracy of the virtual view generated. After the virtual view has been generated by the instantiation module 200, the virtual view may be stored in a database (e.g., the virtual view database 202, etc.).

In one embodiment, a data view (e.g., a snapshot view) may be formed to prevent losing an ability to roll forward and/or backward when a delayed roll backward algorithm is applied. Any number of snapshot views may be taken. However to generate and/or to store a snapshot view may be time and/or capacity consuming. As such, a virtual view of the data may be generated (e.g., generated by the instantiation module 200 of the virtual view module 104 of FIG. 1) rather than making a full snapshot view of the data.

In a further embodiment, the database (e.g., the virtual view database 202) may contain additional databases to store a meta data log file (e.g., the metadata log file database 212), an associated event (e.g., the associated event database 222), and/or a map file (e.g., the map file database 232). A relevant information mapping information (e.g., a map file) of associating an original data to the data view (e.g., a virtual view, a real view, and/or a snapshot view, etc.) may be stored in the map file database 232 of the virtual view database 202. A log file (e.g., a meta data log file) documenting change (e.g., time stamp of changes, location of changes, time offset of changes, etc.) of the data view (e.g., a virtual view, a real view, and/or a snapshot view, etc.) may be stored in the metadata log file database 212. The log file may also be stored as a normal file on a file system using a relational database (e.g., an SQL database).

In yet another embodiment, the virtual view database 202 may communicate with the instantiation module 200 to receive, store, and/or update a data (e.g., the metadata log file, an associated event, and/or a map file, etc.) of the virtual view to ensure that the virtual view remains updated and/or valid. The virtual view database 202 may also transfer the virtual view to the export module 204 having an iSCSI interface (e.g., an iSCSI interface of the iSCSI module 214) and/or a fiber channel interface (e.g., a fiber channel interface of the fiber channel module 224) to automatically transfer the virtual view to an external storage device (e.g., a storage device 102 of FIG. 1).

For example, the data view (e.g., a virtual view, a real view, and/or a snapshot view, etc.) generated (e.g., generated by the instantiation module 200 of the virtual view module 104 of FIG. 1) may also be automatically and/or manually exported via an iSCSI interface (e.g., the iSCSI module 214) and/or a fiber channel interface (e.g., the fiber channel module 224) of an export interface (e.g., the export module 104). As such, each virtual view may be backed up as necessary and/or used for rolling data backward and/or forward in the recovery module 106 of FIG. 1.

In one embodiment, the virtualization module 104 may form a data view (e.g., a virtual view, a real view, and/or a snapshot view, etc.) around a recovery point (e.g., midnight, every 5 minutes, system crash, configuration change, failed log-in, and/or as indicated by the events module 108 of FIG. 1, etc.). The pausing module 206 may temporarily suspend an activity of a client device (e.g., a client device 100 of FIG. 1) before the instantiation module 200 generates a data view (e.g., a virtual view, a real view, and/or a snapshot view, etc.). The pausing module 206 may restart the operation of the client device (e.g., the client device of FIG. 1) after the data view (e.g., a virtual view, a real view, and/or a snapshot view, etc.) has been generated.

In another example embodiment, an event associated with a generation of the data view (e.g., a virtual view, a real view, and/or a snapshot view, etc.) may be stored in the associated event database 222. Additionally, the data view (e.g., a virtual view, a real view, and/or a snapshot view, etc.) may be exported through the iSCSI module 214 and/or the fiber channel module 224 of the export module 214.

In another embodiment, the virtualization module 104 may form the data view (e.g., a virtual view, a real view, and/or a snapshot view, etc.) around a recovery point (e.g., midnight, every 5 minutes, system crash, configuration change, failed log-in, and/or as indicated in the events module 108 of FIG. 1, etc.). The virtualization module 104 may also determine that a data integrity (e.g., unaltered, unmodified, and/or not destroyed, etc.) is consistent at the recovery point by examining data and meta-data associated with the recovery point (e.g., midnight, every 5 minutes, system crash, configuration change, failed log-in, and/or as indicated in the events module 108 of FIG. 1 etc.).

The virtualization module 104 of FIG. 1 may maintain a data adjacent to the recovery point (e.g., midnight, every 5 minutes, system crash, configuration change, failed log-in, and/or as indicated in the events module 108 of FIG. 1, etc.) in a log data structure.

In yet another embodiment, the creation of a virtual view may be specific to a kernel. A drive in the kernel (e.g., piece of software responsible for providing secure access to the machine's hardware to various computer programs) may create a volume object that appears to be a real volume and access requests (e.g., a read, and/or a write request, etc.) to the virtual view may be handled by a kernel space code. A retention log of the virtual view may then be referenced to complete the access requests (e.g., the read, and/or the write request, etc.). A data may be stored in a binary-tree based lookup table to optimize access speed due to a constant time lookup algorithm.

In another embodiment, the virtualization module 104 of FIG. 1 may create a virtual view of a recovery snapshot using an algorithm tied to an original data, a change log data, and a consistency data related to an event (e.g., midnight, every 5 minutes, system crash, configuration change, failed log-in, and/or as indicated in the events module 108 of FIG. 1, etc.). The virtualization module 104 may also redirect the access request (e.g., the read, and/or the write request) to the original based on a meta-data information provided in the virtual view. The virtualization module 104 may also substantially retain a timestamp data, a location of a change, and a time offset of the change as compared with the original data (e.g., originally saved data, an originally backed up data, etc.).

The virtualization module 104 may utilize a relational database (e.g., SQL database) to process the change log data in a meta-data format (e.g., through the metadata log file database 212), and to process other on-disk data using a binary-tree format. The virtual view may be specific to a volume object in a kernel (e.g., piece of software responsible for providing secure access to the machine's hardware to various computer programs) that imitates another volume having the original data. The virtual view may also be managed by a kernel space (e.g., piece of software responsible for providing secure access to the machine's hardware to various computer programs) that processes an access request through at least one table using a meta-data (e.g., the metadata file database 212) created in a retention log. The virtual view may be exported as a virtual volume by the export module 204 using the iSCSI module 214 and/or the fiber channel module 224 to transport to an external processing device (e.g., a computer, a PDA, and/or a storage module 102, etc.).

Furthermore, the virtualization module 104 may apply the change log data of the virtual view database 202 when the virtual view is unfrozen (e.g., unfrozen by the pausing module 206) after a user session reaches a level state. The virtual view may be unfrozen after a user session reaches a level state to be appropriated updated through modifications of the virtual view database 202. Hence a metadata index of the metadata log file database 212 may need to be updated continuously. A map file of the map file database 232 may also need to be updated while the virtual view is being created (e.g., by the instantiation module 200) and/or after it has been created. The updates and/or modifications of the map file (e.g., the map file of the map file database 232) and/or the log file (e.g., the log file of the metadata log file database 212) may be necessary to ensure that the virtual view maintains a relevant representation of the original data.

In a further embodiment, a series of indexes (e.g., using indexes to improve query performance) of the virtual view may be generated by the virtualization module 104 to enable a linking to an event description (e.g., content-based description) of the virtual view rather than to an actual data in the original data. The event description of the virtual view may (e.g., stored in the associated events database 222) allow the series of indexes to locate the virtual views by a content located within the virtual view. The data view (e.g., a virtual view, a real view, and/or a snapshot view, etc.) may also be automatically communicated to the export module 204 to transport the virtual view to a backup tape (e.g., magnetic tape, external hard disk drive, CD, DVD, etc.) to provide extended data retention using a lifecycle management policy. Therefore, older data may be retroactively transferred from the storage module 102 for storage space maintenance.

FIG. 3 is an exploded view of the recovery module 106 of FIG. 1 having a continuous data protection module 300, a delayed roll forward module 302, a delayed roll backward module 304, and/or a coalescing module 306, according to one embodiment.

The continuous protection module 300 may provide continuous backup mechanism (e.g., recording every change made to a data) to a set of data. The continuous protection module 300 may communicate with a storage module (e.g., a storage module 102 of FIG. 1), a client device (e.g., the client device 100 of FIG. 1), and/or an events module (e.g., the events module 108 of FIG. 1) to automatically detect a data change and/or to automatically save the data change.

The delayed roll forward module 302 may communicate with a storage module (e.g., the storage module 102 of FIG. 1) to perform a roll forward operation on a stored data. The delay roll forward module 302 may also communicate with an events module (e.g., the events module 108 of FIG. 1) to associate a data state with a specified event (e.g., midnight, every 5 minutes, system crash, configuration change, failed log-in, and/or as indicated in the events module 108 of FIG. 1 etc.).

The delayed roll backward module 304 may communicate with a storage module (e.g., the storage module 102 of FIG. 1) to perform a roll backward operation on a stored data. The delay roll backward module 302 may also communicate with an events module (e.g., the events module 108 of FIG. 1) to associate a data state with a specified event (e.g., midnight, every 5 minutes, system crash, configuration change, failed log-in, and/or as indicated in the events module 108 of FIG. 1 etc.).

The delayed roll forward module 302 may roll a data to a state corresponding to an event that happened later in time than an event (e.g., midnight, every 5 minutes, system crash, configuration change, failed log-in, and/or as indicated in the events module 108 of FIG. 1, etc.) associated with a reference data. The delayed roll backward module 304 may roll the data to a state corresponding to the event (e.g., midnight, every 5 minutes, system crash, configuration change, failed log-in, and/or as indicated in the events module 108 of FIG. 1, etc.) that happened earlier in time than the event associated with the reference data.

The recovery module 106 of FIG. 1 may also allow backed up data to be accessed before a recovery point (e.g., midnight, every 5 minutes, system crash, configuration change, failed log-in, and/or as indicated in the events module 108 of FIG. 1, etc.) through the delayed roll backward module (e.g., the delayed roll backward module 304) and/or after the certain recovery point through the delayed roll forward module (e.g. the delayed roll forward module 302). The recovery point may be tied to an event (e.g., midnight, every 5 minutes, system crash, configuration change, failed log-in, and/or as indicated by the events module 108 of FIG. 1, etc.).

A coalescing module (e.g., the coalescing module 306) may use a coalescing events and/or a coalescing policies as specified in the events module 108 of FIG. 1 to coalesce (e.g., combine, compile, etc.) backed up data to optimize storage requirements. The coalescing module (e.g., the coalescing module 306) may communicate with an events database (e.g., an events database of the events module 108 of FIG. 1) to determine the event around which data should be collapsed (e.g., coalesced, combined, etc.).

In one embodiment, the delayed roll forward module 302 and/or the delayed roll backward module 304 may shift a data view (e.g., a virtual view, a real view, and/or a snapshot view, etc.) around the recovery point (e.g., midnight, every 5 minutes, system crash, configuration change, failed log-in, and/or as indicated by the events module 108 of FIG. 1, etc.) through a direction-agnostic roll algorithm that uses a roll forward algorithm to shift the data view to a time after the recovery point (e.g., midnight, every 5 minutes, system crash, configuration change, failed log-in, and/or as indicated by the events module 108 of FIG. 1, etc.) and/or a roll backward algorithm to shift the data view (e.g., a virtual view, a real view, and/or a snapshot view, etc.) to a time before the recovery point.

The recovery point (e.g., midnight, every 5 minutes, system crash, configuration change, failed log-in, and/or as indicated by the events module 108 of FIG. 1, etc.) may be associated with an automatically generated event, a user definable event, and/or a prepackaged event. Additionally, the continuous protection module 300 may generate a recovery snapshot at a predetermined interval (e.g., midnight, every 5 minutes, etc.) to retain an ability to position forward and/or backward when a delayed roll backward algorithm is applied.

In a next embodiment, the coalescing module 306 may coalesce data around the recovery point (e.g., midnight, every 5 minutes, system crash, configuration change, failed log-in, and/or as indicated by the events module 108 of FIG. 1, etc.) and other determinable recovery points at a threshold interval to reduce storage requirements. In addition, the coalescing module 306 may retain different quantities of data around the recovery point (e.g., midnight, every 5 minutes, system crash, configuration change, failed log-in, and/or as indicated by the events module 108 of FIG. 1, etc.) based on a programmatic methodology that considers space utilization and a data consistency associated with the time after the recover point and/or the time before the recovery point. For example, more data points may be retained for data accumulated 5 days ago whereas less data points may be retained for data accumulated 5 years ago.

FIG. 4 is an exploded view of the events module 108 of FIG. 1 having a trigger database 400 having a time based database 410 and/or an event based database 420, a coalescing events database 402, a coalescing policies database 404, a flag depository database 406, and/or an event detector module 408, according to one embodiment.

In one example embodiment, the trigger database 400 may store any backup triggering event. The backup triggering event may be time based (e.g., stored in the time based database 410) and/or event based (e.g., stored in the event based database 420). The coalescing events database may communicate with a coalescing module (e.g., a coalescing module 306 of FIG. 3) to determine an event corresponding to a data collapsing. The coalescing policies database 404 may also communicate with the coalescing module 306 of FIG. 3 to govern an age dependent data retaining mechanism. For example, older data may be retained with less data points. The flag depository database 406 may communicate with the trigger database 400, the storage database 102 of FIG. 1, and/or the continuous data protection module 300 of FIG. 3 to store a flag indicating a data state associated with an event as specified in the events module 108 of FIG. 1 at which data was backed up. The event detector module 408 may detect a user definable event and/or an automatically generated event by communicating with a client device 100, the trigger database 400, the coalescing events database 402, and/or the coalescing policies database 404. The user definable event may be communicated by a client device (e.g., the client device 100 of FIG. 1). The events detected by the event detector module 408 may then be stored in the trigger database 400 and stored in the time based database 410 if an event is time based (e.g., midnight, every 5 minutes, etc.), and stored in the event based database 420 if the event is event based e.g., system crash, configuration change, failed log-in, and/or as indicated by the events module 108 of FIG. 1, etc.).

In another example embodiment, the events module (e.g. the events module 108 of FIG. 1) may also communicate with a recovery module (e.g., the recovery module 106 of FIG. 1) to associate data points with events (e.g., midnight, every 5 minutes, system crash, configuration change, failed log-in, and/or as indicated by the events module 108 of FIG. 1, etc.). As such the recovery module (e.g., the recovery module 106 of FIG. 1) may perform relevant operations (e.g., a delayed roll forward of the delayed roll forward module 302, a delayed roll backward of the delayed roll backward module 304, and/or coalescing of the coalescing module 306 of FIG. 3, etc.) based on an associated event.

The event detector module 408 of the events module 108 may also detect coalescing events defined by a user and/or automatically generated. The coalescing events may be stored in the coalescing events database 402. In another embodiment, the events module 108 may generate a coalescing policy (e.g., number of data points retained for different time periods, etc.) around the recovery point (e.g., midnight, every 5 minutes, system crash, configuration change, failed log-in, and/or as indicated by the events module 108 of FIG. 1, etc.) to reduce a storage requirement. The coalescing policy may be stored in the coalescing policy database 404.

In one embodiment, the event detector module 408 may generate a marking data (e.g., a flag, a bookmark, etc.) at the recovery point (e.g., midnight, every 5 minutes, system crash, configuration change, failed log-in, and/or as indicated by the events module 108 of FIG. 1, etc.) to enable the direction-agnostic roll algorithm (e.g., a roll-forward algorithm (e.g., to roll to a data state that occurred later in time than the reference data, etc.) and/or a roll-backward algorithm (e.g., to roll to the data state that occurred earlier in time than the reference data, etc.) to operate and to reduce a recovery time objective (e.g., to minimize the time to recovery in case of system malfunction) when an algorithm is applied. The marking data (e.g., a flag, a bookmark, etc.) may be stored in the flag depository database 406.

Figure 5:
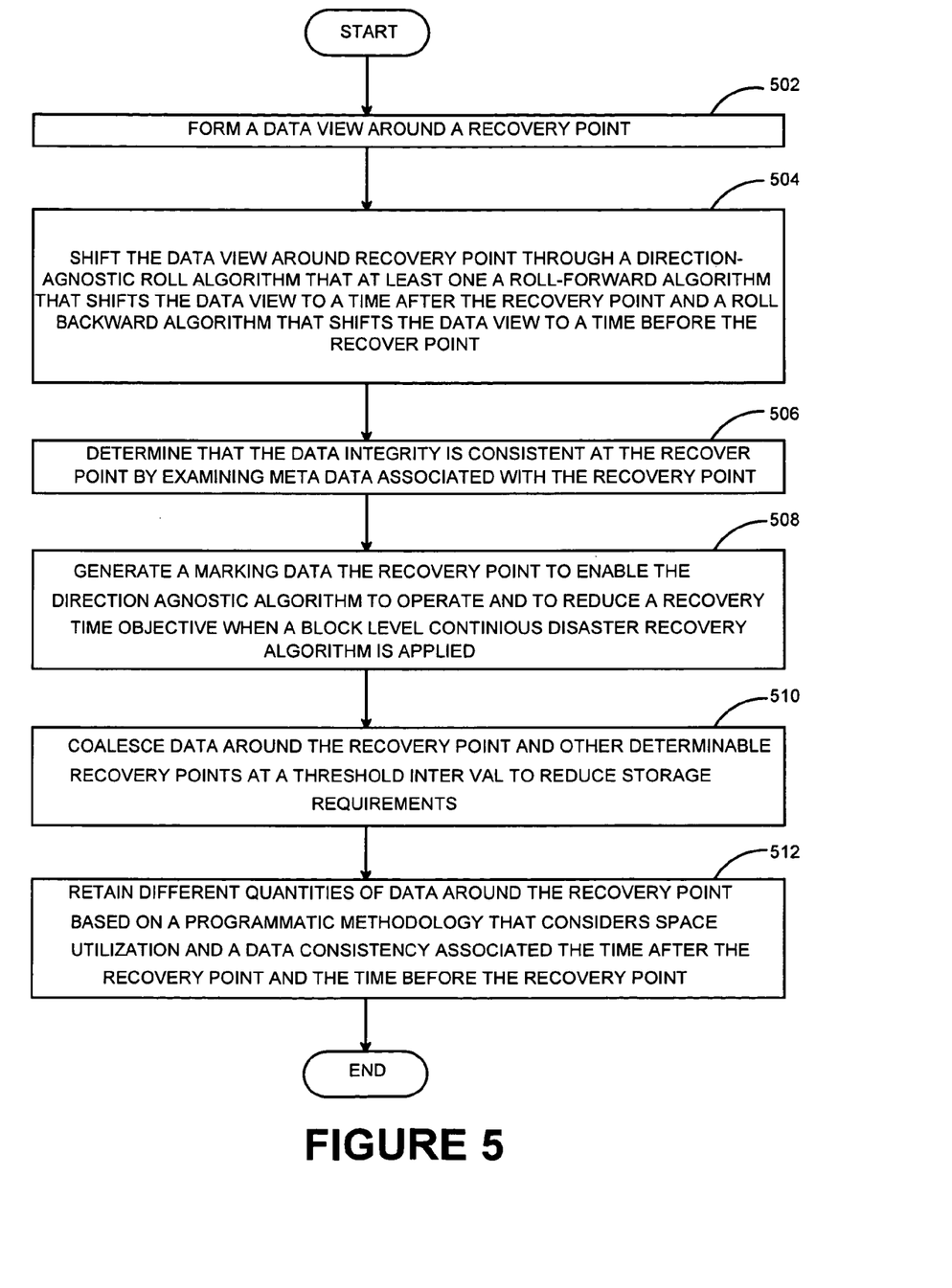
FIG. 5 is a process flow to form a data view around a recovery point, according to one embodiment.

FIG. 5 is a process flow to form a data view around a recovery point, according to one embodiment. In operation 502, the data view (e.g., a virtual view, a real view, and/or a snapshot view, etc.) may be formed (e.g., formed by the virtual view module 104 of FIG. 2) around a recovery point (e.g., midnight, every 5 minutes, system crash, configuration change, failed log-in, and/or as indicated by the events module 108 of FIG. 1, etc.). In operation 504, the data view may be shifted (e.g., shifted by the delayed roll forward module 302 and/or the delayed roll backward module 304 of FIG. 3) around the recovery point (e.g., midnight, every 5 minutes, system crash, configuration change, failed log-in, and/or as indicated by the events module 108 of FIG. 1, etc.) through a direction-agnostic roll algorithm that uses at least one of a roll-forward algorithm (e.g., to roll to a data state that occurred later in time than the reference data, etc.) to shift the data view (e.g., a virtual view, a real view, and/or a snapshot view, etc.) to a time after the recovery point (e.g., midnight, every 5 minutes, system crash, configuration change, failed log-in, and/or as indicated by the events module 108 of FIG. 1, etc.) and a roll-backward algorithm (e.g., to roll to the data state that occurred earlier in time than the reference data, etc.) to shift the data view (e.g., a virtual view, a real view, and/or a snapshot view, etc.) to a time before the recover point (e.g., midnight, every 5 minutes, system crash, configuration change, failed log-in, and/or as indicated by the events module 108 of FIG. 1, etc.).

In operation 506, a data integrity may be determined to be consistent (e.g., complete, valid, etc.) at the recovery point e.g., midnight, every 5 minutes, system crash, configuration change, failed log-in, and/or as indicated by the events module 108 of FIG. 1, etc.) by examining data and meta-data associated with the recovery point. In operation 508, a marking data (e.g., a flag, a bookmark, etc.) may be generated (e.g., generated by the recovery module 106 of FIG. 1) at the recovery point (e.g., midnight, every 5 minutes, system crash, configuration change, failed log-in, and/or as indicated by the events module 108 of FIG. 1, etc.) to enable the direction-agnostic roll algorithm (e.g., a roll forward algorithm of the delayed roll forward module 302 of FIG. 3, and/or a roll backward algorithm of the delayed roll backward module 304 of FIG. 3, etc.) to operate and to reduce a recovery time objective (e.g., a time required to recover from a system failure, etc.) when an algorithm is applied.

In operation 510, data may be coalesced (e.g., coalesced by the coalescing module 306 of FIG. 3) around the recovery point (e.g., midnight, every 5 minutes, system crash, configuration change, failed log-in, and/or as indicated by the events module 108 of FIG. 1, etc.) and other determinable recovery points at a threshold interval to reduce storage requirements. In operation 512, differing quantities of data may be retained around the recovery point (e.g., midnight, every 5 minutes, system crash, configuration change, failed log-in, and/or as indicated by the events module 108 of FIG. 1, etc.) based on a programmatic methodology that considers space utilization and a data consistency associated with the time after the recovery point (e.g., midnight, every 5 minutes, system crash, configuration change, failed log-in, and/or as indicated by the events module 108 of FIG. 1, etc.) and the time before the recovery point.

Figure 6:
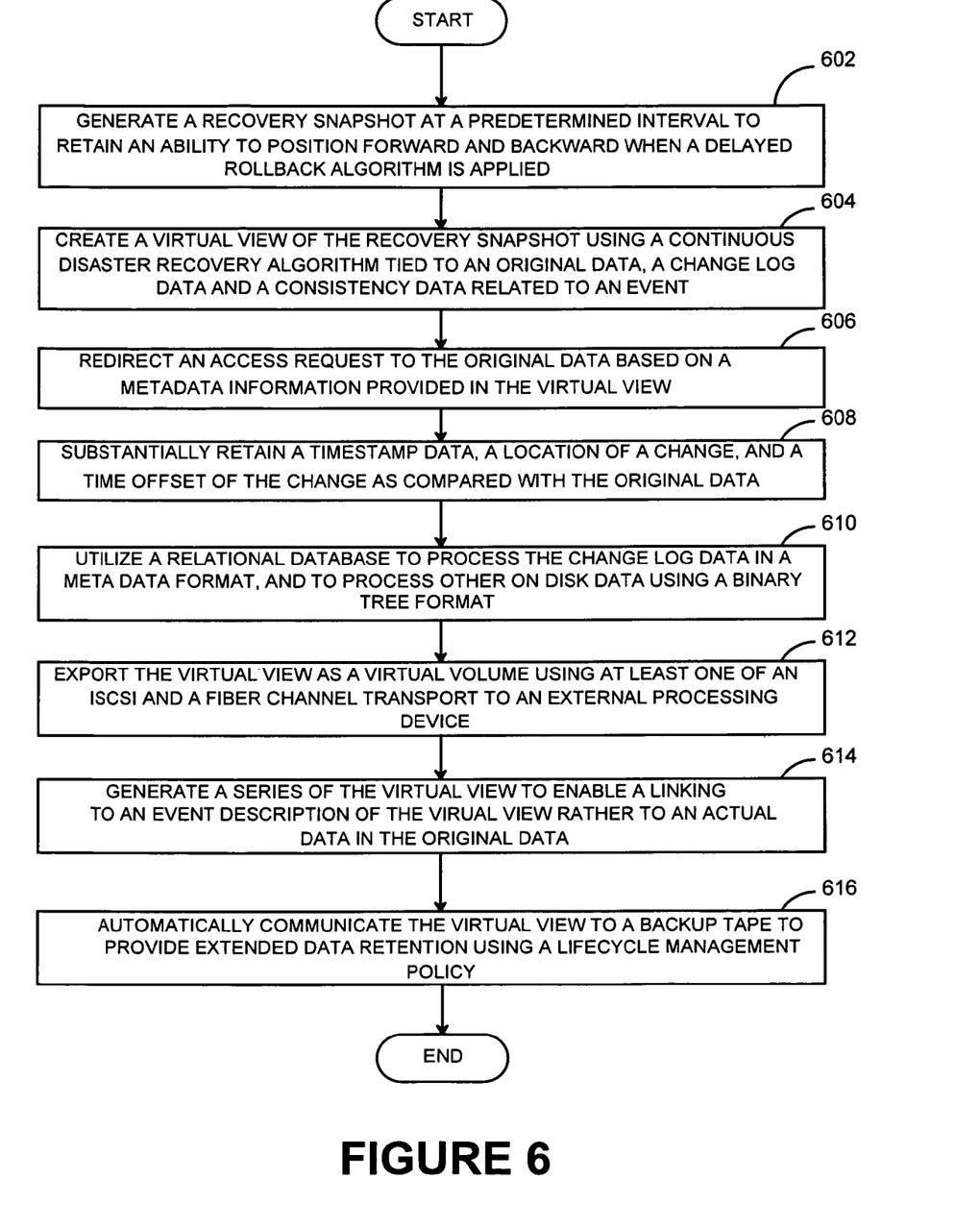
FIG. 6 is a process flow to generate a recovery snapshot at a predetermined interval to retain an ability to position forward and backward when a delayed roll back algorithm is applied, according to one embodiment.

FIG. 6 is a process flow to generate a recovery snapshot at a predetermined interval to retain an ability to position forward and backward when a delayed roll back algorithm (e.g., the delayed roll back algorithm of the delayed roll backward module 304 of FIG. 3) is applied, according to one embodiment.

In operation 602, a recovery snapshot may be generated at a predetermined interval (e.g., midnight, every 5 minutes, etc.) to retain an ability to position forward and backward when a delayed roll back algorithm (e.g., the delayed roll back algorithm of the delayed roll backward module 304 of FIG. 3) is applied. In operation 604, a virtual view of the recovery snapshot may be created using an algorithm (e.g., the continuous disaster recovery algorithm of the continuous data protection module 300 of FIG. 3) tied to an original data, a change log data, and a consistency data related to an event (e.g., midnight, every 5 minutes, system crash, configuration change, failed log-in, and/or as indicated by the events module 108 of FIG. 1, etc.). In operation 606, an access request to the original data may be redirected based on a meta-data information provided in the virtual view. In operation 608, a timestamp data, a location of a change, and a time offset of the change as compared with the original data may be substantially retained.

In operation 610, a relational database (e.g., SQL database) may be utilized to process the change log data in a meta-data format (e.g., the change log data of a metadata log file database 212 of FIG. 2), and to process other on-disk data using a binary-tree format. In operation 612, the virtual view (e.g., the virtual view stored in the virtual view database 202 of FIG. 2) may be exported as a virtual volume using at least one of an iSCSI (e.g., the iSCSI module 214 of FIG. 2) and a fiber channel (e.g., the fiber channel module 224 of FIG. 2) transport to an external processing device. In operation 614, a series of indexes of the virtual view may be generated (e.g., the virtual view generated by the instantiation module 200 of FIG. 2) to enable a linking to an event description (e.g., midnight, every 5 minutes, system crash, configuration change, failed log-in, and/or as indicated by the events module 108 of FIG. 1, etc.) of the virtual view rather than to an actual data in the original data.

In operation 616, the virtual view may be automatically communicated (e.g., communicated by the export module 204 of FIG. 2) to a backup tape (e.g., through an iSCSI interface (e.g., the iSCSI module 214) and/or a fiber channel interface (e.g., the fiber channel module 224) of FIG. 2) to provide extended data retention using a lifecycle management policy.

Figure 7:
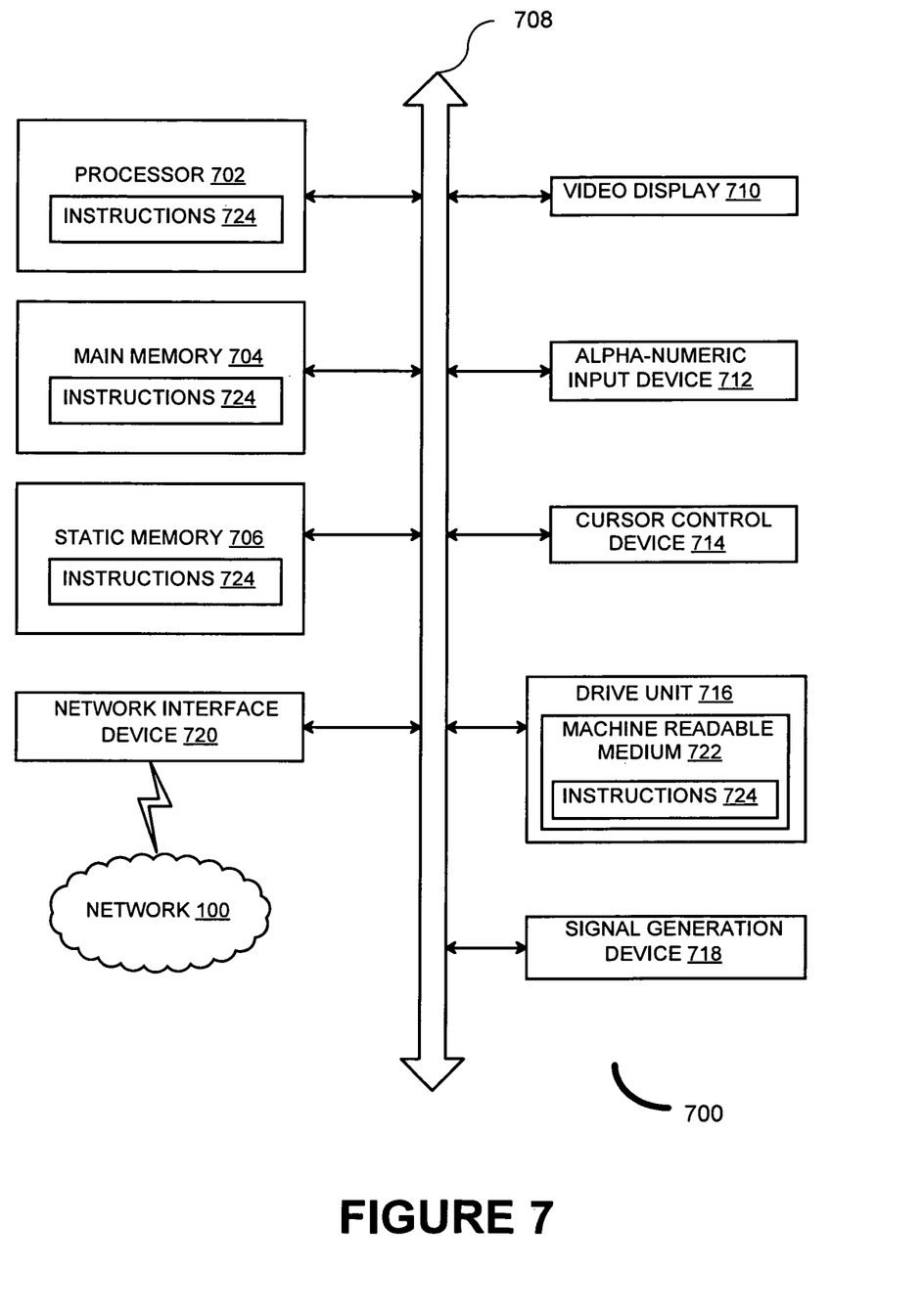
FIG. 7 is a diagrammatic representation of a machine in the form of a data processing system within which a set of instructions, for causing the machine to perform any one or more of the methodologies discussed herein, may be executed, according to one embodiment.

FIG. 7 shows a diagrammatic representation of a machine in the example form of a computer system 700 within which a set of instructions, for causing the machine to perform any one or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 700 includes a processor 702 (e.g., a central processing unit (CPU) a graphics processing unit (GPU) and/or both), a main memory 704 and a static memory 707, which communicate with each other via a bus 708. The computer system 700 may further include a video display unit 710 (e.g., a liquid crystal display (LCD) and/or a cathode ray tube (CRT)). The computer system 700 also includes an alphanumeric input device 712 (e.g., a keyboard), a cursor control device 714 (e.g., a mouse), a disk drive unit 717, a signal generation device 718 (e.g., a speaker) and a network interface device 720.

The disk drive unit 717 includes a machine-readable medium 722 on which is stored one or more sets of instructions (e.g., software 724) embodying any one or more of the methodologies and/or functions described herein. The software 724 may also reside, completely and/or at least partially, within the main memory 704 and/or within the processor 702 during execution thereof by the computer system 700, the main memory 704 and the processor 702 also constituting machine-readable media.

The software 724 may further be transmitted and/or received over a network 727 via the network interface device 720. While the machine-readable medium 722 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

FIG. 8 is a graphical view of a coalesce process, according to one embodiment. Particularly, FIG. 8 illustrates a current point 800 (e.g., a current time), a x-time point 802, a coalesced data 804, a storage 806, and a non-overlapping sectors 808. The current point 800 may be the current day, time, and or window in the current temporal period. The x-time point 802 may be a point in time in the past that is automatically determined and/or provided by a user.

The coalesced data 804 may be a data that has been coalesced before the x-time point 802. The storage 806 may be a storage area of coalesced data. The non-overlapping sectors 808 may be data that is outside the coalesce data blocks (e.g., data blocks that are not in a window of blocks that are repeatedly overwritten between events). The darker lines in FIG. 8 may represent a set of events at which data is backed up, and lighter lines (e.g., between the current point 808 and the x-time point 802) may be intermediate backup points that are coalesced after the x-time point.

For example, the period between the current point 800 and the x-time point 802 may be a temporal window based on at least one of a user data and an automatically generated data. Data between events prior to the temporal window (e.g., before the x-time point 802 of FIG. 8) may be coalesced. In addition, data between events after the temporal window may be captured (e.g., as illustrated by the lighter lines after the x-point 802 in FIG. 8). The coalescing data between events prior to the temporal window may be determined by a set of overlapping operations to a data set, wherein certain operations have non-overlapping sectors which are not coalesced (e.g., the non-overlapping sectors 808 may not be coalesced).

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the client device 100, the storage module 102, the virtualization module 104, the recovery module 106, the events module 108, the network module 100, the instantiation module 200, the export module 204, the pausing module 206, the iSCSI module 214, the fiber channel module 224, the continuous data protection module 300, the delayed roll forward module 302, the delayed roll backward module 304, the coalescing module 306, and/or the event detector module 408 may be enabled using transistors, logic gates, and electrical circuits (e.g., application specific integrated ASIC circuitry) using a client device circuit, a storage module circuit, a virtualization circuit, a recovery circuit, an events circuit, a network circuit, an instantiation circuit, an export circuit, a pausing circuit, an iSCSI circuit, a fiber channel circuit, a continuous data protection circuit, a delayed roll forward circuit, a delayed roll backward circuit, a coalescing circuit, and/or an event detector circuit.

In addition, it will be appreciated that the various operations, processes, and methods disclosed herein may be embodied in a machine-readable medium and/or a machine accessible medium compatible with a processing system (e.g., a computer system), and may be performed in any order. Accordingly, the specification and drawings are to be regarded in an illustrative rather than a restrictive sense.

What is claimed is:

1. A network, comprising:
a client device associated with the network to generate a data operation;
a virtualization module configured to communicate with the client device through the network to form a data view around a recovery point following at least one of a pause and a suspension of the data operation;
a recovery module configured to communicate with the client device through the network to generate a recovery snapshot at a predetermined interval characteristic of the recovery point in accordance with an appropriate request from the client device, the recovery snapshot having an ability to position forward and backward from the recovery point when a rolling algorithm is applied, thereby providing an ability to roll to a data state occurring earlier in time compared to the recovery point and to a data state occurring later in time compared to the recovery point; and
an events module configured to communicate with the client device through the network to generate a coalesce policy around the recovery point to reduce a storage requirement, the events module being configured to indicate the predetermined interval at which the recovery snapshot is generated.

2. The network of claim 1, further comprising an export module to transfer the data view to an external processing device as a virtual volume using at least one of an iSCSI and a fiber channel transport interface.

3. The network of claim 2, wherein the export module automatically communicates the data view to a backup tape to provide extended data retention in accordance with a lifecycle management policy.

4. The network of claim 1, further comprising an instantiation module of the virtualization module to generate a virtual view of a data state and to communicate the virtual view to a virtual view database.

5. The network of claim 1, further comprising a pausing module to pause at least one of the data operation and a client operation.

6. The network of claim 4, wherein the virtual view is specific to a volume object in a kernel that imitates another volume having an original data.

7. The network of claim 6, wherein the virtual view is managed by a kernel space that processes an access request through at least one table using a meta-data created in a retention log.

8. The network of claim 4, wherein a change log data is applied when the virtual view is unfrozen after a user session reaches a level state.

9. The network of claim 1, wherein the coalesce policy is used to determine a variable quantity of data to be coalesced based on an algorithm.

10. The network of claim 9, wherein the algorithm is affected by space utilization and a data consistency with at least one of a data prior to the recovery point and data after the recovery point.

11. The network of claim 1, further comprising an age dependent data mechanism to coalesce data based on a coalescing policies database and a coalescing module.

12. The network of claim 1, wherein the coalesce policy affects a number of data points retained for a selected time period.

13. The network of claim 1, wherein the coalesce policy is altered by at least one of a repeated time interval, a system event, a configuration change, an access event, and an event module indication.

14. A method, comprising:
generating a data operation from a client device associated with a network;
forming a data view around a recovery point through communicating with the client device through the network following at least one of a pause and a suspension of the data operation;
generating, in accordance with an appropriate request from the client device through the network, a recovery snapshot at a predetermined interval characteristic of the recovery point indicated through an events module, the recovery snapshot having an ability to position forward and backward from the recovery point when a rolling algorithm is applied, thereby providing an ability to roll to a data state occurring earlier in time compared to the recovery point and to a data state occurring later in time compared to the recovery point; and
generating, through communication with the client device through the network, a coalesce policy around the recovery point to reduce a storage requirement.

15. The method of claim 14, further comprising transferring the data view to an external processing device as a virtual volume using at least one of an iSCSI and a fiber channel transport interface.

16. The method of claim 14, further comprising automatically communicating the data view to a backup tape to provide extended data retention in accordance with a lifecycle management policy.

17. The method of claim 14, further comprising generating a virtual view of a data state and communicating the virtual view to a virtual view database.

18. The method of claim 17, further comprising pausing at least one of the data operation and a client operation when the virtual view is generated.

19. The method of claim 17, further comprising managing the virtual view using a kernel space that processes an access request through at least one table using a meta-data created in a retention log.

20. A non-transitory computer-readable medium including instructions embodied therein that are executed through a computing system, comprising:
instructions for forming a data view around a recovery point through communicating with a client device through a network following at least one of a pause and a suspension of a data operation generated by the client device;
instructions for generating, in accordance with an appropriate request from the client device through the network, a recovery snapshot at a predetermined interval characteristic of the recovery point indicated through an events module, the recovery snapshot having an ability to position forward and backward from the recovery point when a rolling algorithm is applied, thereby providing an ability to roll to a data state occurring earlier in time compared to the recovery point and to a data state occurring later in time compared to the recovery point; and
instructions for generating, through communication with the client device through the network, a coalesce policy around the recovery point to reduce a storage requirement.

* * * * *